(12) United States Patent
Decker et al.

(10) Patent No.: US 7,464,754 B1
(45) Date of Patent: Dec. 16, 2008

(54) $CO_2$ FOAMED WELL TREATMENTS

(75) Inventors: Randal L. Decker, Midland, TX (US);
Michael D. Hyman, Odessa, TX (US);
John J. Ridge, Hobbs, NM (US)

(73) Assignee: Team CO2, Inc., Midland, TX (US)

( * ) Notice: Subject to any disclaimer, the term of this patent is extended or adjusted under 35 U.S.C. 154(b) by 92 days.

(21) Appl. No.: 11/175,956

(22) Filed: Jul. 7, 2005

Related U.S. Application Data

(60) Provisional application No. 60/522,537, filed on Oct. 11, 2004.

(51) Int. Cl.
*E21B 43/00* (2006.01)

(52) U.S. Cl. ..................................... 166/263

(58) Field of Classification Search ...................... None
See application file for complete search history.

(56) References Cited

U.S. PATENT DOCUMENTS

| | | | |
|---|---|---|---|
| 4,650,000 A | | 3/1987 | Andreasson et al. |
| 4,737,296 A | | 4/1988 | Watkins |
| 5,069,283 A | * | 12/1991 | Mack ....................... 166/308.6 |
| 5,207,778 A | * | 5/1993 | Jennings, Jr. ................ 166/281 |
| 6,555,505 B1 | | 4/2003 | King et al. |

* cited by examiner

*Primary Examiner*—Jennifer H Gay
*Assistant Examiner*—Kerry W Leonard
(74) *Attorney, Agent, or Firm*—F. Lindsey Scott

(57) ABSTRACT

A composition and a method for treating a subterranean formation with an injection liquid containing liquid carbon dioxide, a treating liquid and optionally a foaming agent and/or methanol. The treating liquid may be an acid, a corrosion inhibitor, a solvent or a scale inhibitor.

11 Claims, 4 Drawing Sheets

CO₂ FOAMED WELL TREATMENTS

RELATED APPLICATIONS

This application is entitled to and hereby claims the benefit of the filing date of U.S. Provisional Application 60/522,537 filed Oct. 11, 2004 by Randal L. Decker, Michael D. Hyman and John J. Ridge and entitled "CO₂ Foamed Acid."

FIELD OF THE INVENTION

The present invention relates to a composition and a method for treating subterranean formations with acid, corrosion inhibitors, scale inhibitors and the like.

BACKGROUND OF THE INVENTION

In many wells used for the production of oil, water, gas and the like, it becomes necessary from time to time to treat such wells to improve their permeability, to inject materials which can protect metallic components of the well from corrosion and which can protect the formation, especially the formation near the wellbore, from scaling as a result of the production of fluids from the well.

Many of these operations are used more frequently in oil wells and in gas wells than in water wells.

In many instances, formations which contain valuable oil or gas products may be so impermeable that the production of fluids from these formations, either initially or after a period of production is impractically slow. In such instances, a variety of techniques have been used to improve the production rate. One technique is the use of fracturing. This procedure requires that a pressure greater than the formation pressure be imposed on the formation to create fractures into the formation. While this technique has been effective in many instances, it is limited in that it creates a flow path only through the areas fractured. This leaves major portions of the formation untreated to improve the permeability.

Acid treatments have been used with and without foaming and emulsifying agents to pass acids and the like into the formation. Unfortunately, because of the limited permeability initially present or present at the time of treatment, these materials are difficult to inject into the formation for any substantial distance without the injection of unduly large volumes of the treating material.

As a result, a continuing effort has been directed to the development of methods which are effective to inject treating solutions into subterranean formations for a substantial distance without the use of unduly large volumes of treating fluid.

SUMMARY OF THE INVENTION

The invention comprises a method for treating a subterranean formation penetrated from an earth surface by at least one well, the method comprising: blending a treating liquid and liquid carbon dioxide ($CO_2$) to produce an injection liquid containing from about 51 to about 95 weight percent liquid $CO_2$; injecting the injection liquid into the subterranean formation; and, shutting in the well for at least one hour.

The invention also comprises a composition for treating a subterranean formation penetrated from an earth surface by at least one well, the composition consisting essentially of: from about 51 to about 95 weight percent liquid $CO_2$; and, from about 5 to about 49 weight percent of a treating fluid.

The invention further includes a composition for treating a subterranean formation penetrated from an earth surface by at least one well, the composition comprising essentially of: from about 51 to about 95 weight percent liquid $CO_2$; from about 5 to about 49 weight percent of a treating fluid; and, at least one of a foaming agent and methanol.

DETAILED DESCRIPTION OF THE INVENTION

In the description of the present invention, detailed descriptions of the equipment used are not included since they are not necessary to the description of the present invention and include well-known equipment.

Figure 1:
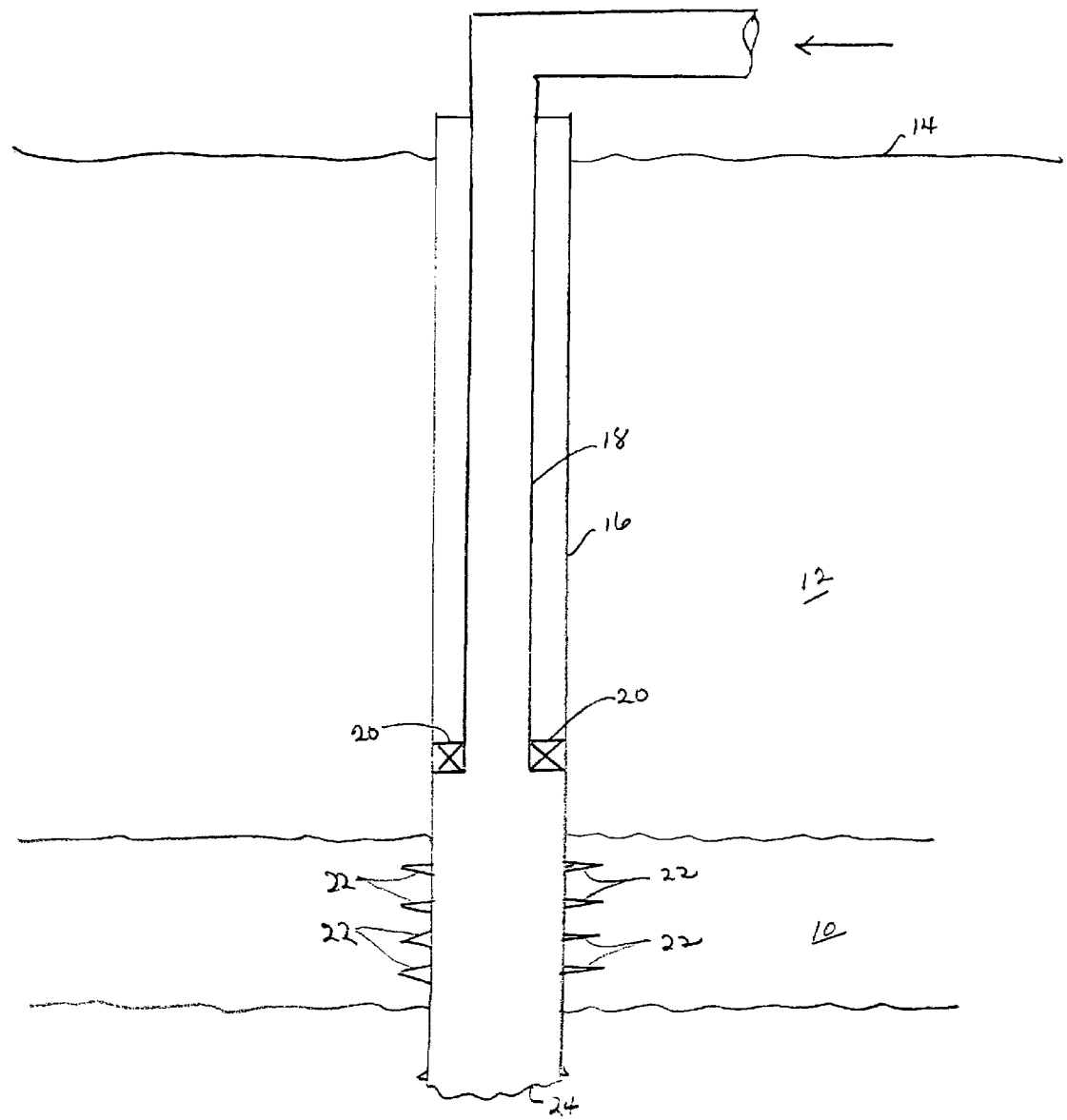
FIG. 1. is a schematic diagram of a well penetrating a subterranean formation and adapted to treat the subterranean formation according to the present invention.

In FIG. 1 a subterranean formation 10, which is to be treated is shown. Subterranean formation 10 underlies an overburden 12 and an earth surface 14. Subterranean formation 10 is penetrated by a well 16, which includes tubing 18 and packers 20 to enable the injection of a treating liquid into subterranean formation 10. Well 16, while not described in detail, is a cased well and includes perforations 22, extending from an inside of the well into subterranean formation 10. The bottom 24 of the well may be directly beneath subterranean formation 10 or well 16 may extend into subterranean formations lying beneath subterranean formation 10. If so, it is desired that subterranean formation 10 be isolated, as well known to those skilled in the art, for treatment.

Figure 2:
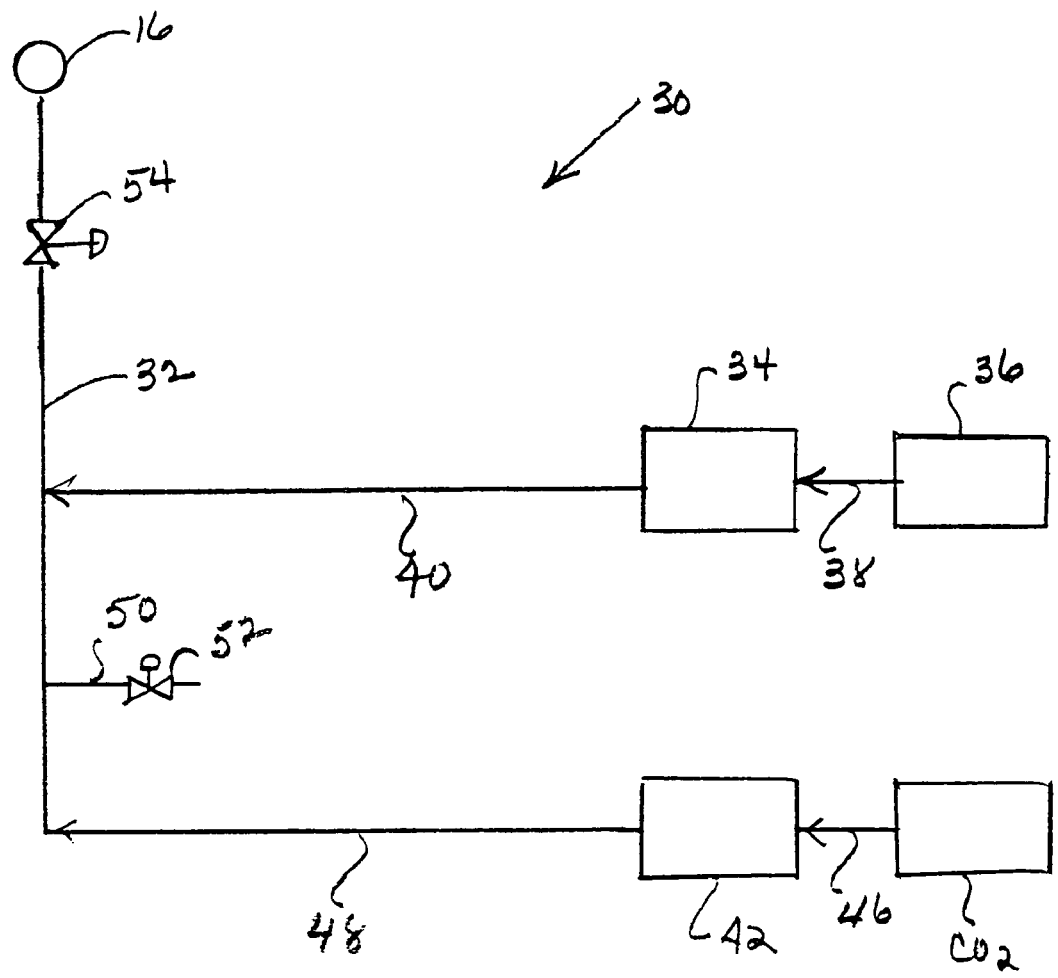
FIG. 2. is a schematic diagram of a system for supplying the composition of the present invention to a well.

In FIG. 2 a system 30 is shown for producing the composition of the present invention for injection into well 16. The system comprises a line 32, which is in fluid communication with a system for mixing the components via line 32 and a check valve 54 and with well 16. An acid pump 34 is shown in communication via a line 38 with an acid supply 36 to supply acid via a line 40 at a desired pressure and rate to line 32. Similarly, a $CO_2$ pump 42 is shown in communication with a $CO_2$ supply 44 via a line 46 so that liquid $CO_2$ is desirably pumped via a line 48 into line 32. Line 32 includes a line 50 and a pressure valve 52 for the relief of pressure if desired. It will be understood that the acid supply and the liquid $CO_2$ supply could be originally provided at pressure so that it would be unnecessary to have pumps for either or both. Such variations are considered to be well within the scope of the present invention.

According to the present invention, the treating fluid is mixed with liquid $CO_2$ to produce an injection liquid containing from about 51 to about 95 weight percent liquid $CO_2$. Preferably, the liquid $CO_2$ is present in a weight percentage from about 60 to about 80. The resulting injection fluid is injected into the subterranean formation, which is then shut in for at least one hour.

The treating fluid may be any well-treating material such as an acid, a corrosion inhibitor, a solvent or a scale inhibitor. The acid may be any suitable inorganic or organic acid, such as acids selected from the group consisting of hydrochloric, perchloric, nitric, sulfuric, phosphoric, hydrobromic, hydrofluoric, hydriodic, citric, acetic and the like. Substantially any suitable acid can be used, so long as it is compatible with the subterranean formation and effective to dissolve small portions of the formation or otherwise treat the formation as desired. The acid is mixed with liquid $CO_2$ in an amount from about 51 to about 95 weight percent to produce a composition comprising about 51 to about 95 weight percent liquid $CO_2$ and from about 5 to about 49 weight percent acid. The acid may be provided as an aqueous solution such as hydrochloric acid, which is frequently marketed in concentrations of about 3.0 to about 28 volume percent in aqueous solution. The weight references herein are to the acid in the form in which it is supplied and injected. In other words, a 15 volume percent hydrochloric acid in aqueous solution would be injected in an amount equal to the stated weight percent of the aqueous solution. Similar consideration is applied to the other acids used.

The liquid $CO_2$ is pumped at temperatures typically from about −10 to about 5° F., but may be pumped at temperatures from about −15 to about 10° F. The liquid $CO_2$ may be pumped at any suitable temperature and pressure at which the $CO_2$ is liquid. In other words, at higher pressures the temperature of the liquid $CO_2$ can be higher. The liquid $CO_2$ and the acid are physically mixed at the wellhead or at the pump discharge or the like. The liquid $CO_2$ is quite soluble in the acids and they form a microemulsion that has a viscosity of about 20 to about 90 centipoises a lower relative permeability than plain acid. Testing has indicated that plain acid has a relative permeability of about 4 millidarcy (md), while the $CO_2$ foamed acid had a relative permeability of 0.3 md for the acid component (a decrease of over 13 times or 1300%) while the relative permeability to the $CO_2$ component was 0.2 md (a decrease of 20 times or 2000%) depending upon the amount of liquid $CO_2$ used. The much lower relative permeability, and conversely higher viscosity, are critical in reducing acid leak-off near the wellbore and thereby causing the formation of a main flow channel for the acid to penetrate deeper into the formation than non-foamed and/or low viscosity acids.

Generally speaking higher concentrations of liquid $CO_2$ result in a higher viscosity. This higher viscosity in the liquid $CO_2$/treating liquid microemulsion acts as a fluid loss agent preventing leak off of the acid from the near wellbore. The injection mixture forms one or more main flow channels (worm holes) in the formation so that the microemulsion is pushed deeper into the formation by the injection of lesser volumes than by the injection of the acid or other material alone. The microemulsion is forced deeper into the formation and reaches the areas of the reservoir which have not been previously produced or depleted. Once the microemulsion is in place, it tends to release the acid or other treating material into the subterranean formation for its interaction with the formation.

Desirably the acid optionally contains a foaming agent, which may be any suitable foaming agent compatible with the subterranean formation and the acid. For instance, some suitable foaming agents are shown in U.S. Pat. No. 4,737,296 issued Apr. 12, 1998 to David R. Watkins. The foaming agent may comprise a surfactant system as disclosed in U.S. Pat. No. 4,650,000 issued Mar. 17, 1987 to Eva M. Andreasson, et al. Additional foaming agents for foaming and stabilizing acidizing fluids are disclosed in U.S. Pat. No. 6,555,505 issued Apr. 29, 2003 to Karen L. King, et al. These patents are hereby incorporated in their entirety by reference.

As indicated previously, substantially any suitable foaming agent compatible with the liquid $CO_2$ and the treating fluid is effective.

Further it is desirable that the acid contains quantities of methanol. While the presence of methanol is optional, it is desired that the methanol be present in an amount from about 5 to about 25 weight percent in the preferred composition.

The composition of the present invention can be used to inject acid, organic solvents, scale inhibitors or corrosion inhibitors into the formation. While acidizing is a commonly used treatment which is greatly improved by the process and composition of the present invention, it is noted that in some instances it is desirable to inject organic solvents into a subterranean formation to remove materials such as, for instance, asphaltenes deposited near a production wellbore or at production sites within the formation at which hydrocarbons are released into a permeable flow path into a wellbore or the like. Similarly, scale inhibitors are frequently injected for a substantial distance into the formation to inhibit the formation of scale as water, oil or gas components are released from the formation with the resulting formation of scale in the pores from which they are released and through which they pass. It is quite commonly necessary to inject a scale inhibitor to maintain production in a subterranean formation. Such scale inhibitor injections may be made after an acid treatment to remove scale or the like, as known to those skilled in the art. Further, corrosion inhibitors may desirably be injected to inhibit corrosion of well components as fluids are produced through such well components. In other words, the injection of the corrosion inhibitors a substantial distance into the formation results in the production of the corrosion inhibitor in trace quantities (which may be sufficient to inhibit corrosion in the well equipment) with the produced fluids The method of the present invention comprises forming the composition and injecting it into the subterranean formation and thereafter shutting in the well for at least one hour.

As discussed previously, the microemulsion has much lower interfacial tension and a higher viscosity than the acid without the addition of the liquid $CO_2$. These two qualities combine to give the microemulsion the ability to penetrate deeply into the subterranean formation. The mixture is pumped into the well at pressures adequate to inject it into the formation. The quantity injected will be determined by the pore volume which it is desired to treat Particularly when acids are injected but in general with all the materials, the treating materials will have an interaction with the formation rock to dissolve, clean, treat or otherwise modify the rock's ability to produce oil, gas, water or the like. The mixture is pumped into the well at pressures below fracturing pressure, but adequate to inject it into the formation as noted and in a volume sufficient to treat the volume of the well which is desired to be treated. If it is desired to push the composition deeply into the well, a slug containing from 0 to about 100 weight percent liquid $CO_2$ and from about 0 to about 100 weight percent water or crude oil may be used for injection into the well to push the composition further into the formation. Desirably once the composition is in place, it is left in place for a period of time to absorb heat from the formation and generate foam. The foam then moves out into formation portions which have not previously been treated. Desirably the composition is left in place in the formation for at least one hour and preferably up to 4 hours or longer.

With the formation shut in, the foam is pushed into areas of the formation which have not previously been treated from the flow path created by the injection of the composition by the increased pressure in the well.

Placing the composition in the subterranean formation, as discussed above, when corrosion inhibitors or scale inhibitors are used, results in positioning these materials in the formation so that they can be produced back with the materials produced from the formation to inhibit corrosion of well tubulars, which include rods, tubing, casing, packers, bridge plugs and subsurface pumping equipment and the like. Similarly, the use of scale inhibitors not only inhibits scale formation in the formation but also on the same components of the well.

The composition of the present invention comprises from about 51 to about 95 weight percent liquid $CO_2$ and from about 5 to about 49 weight percent of a treating fluid. The treating fluid, as indicated previously, may be an acid, an inorganic solvent, a scale inhibitor or a corrosion inhibitor, or any other desired treating fluid. The present method and composition are directed to a carrier composition which is useful to carry treating fluids into a subterranean formation more efficiently and more effectively than has been previously possible.

Desirably the composition contains from about 60 to about 80 weight percent $CO_2$ in the composition. As indicated, increased quantities of liquid $CO_2$ result in increased viscosity and more effective movement in a slug fashion through the formation.

Desirably in the composition, the treating liquid is at least one of an inorganic acid, an organic acid, an organic solvent, a scale inhibitor or a corrosion inhibitor or the like. Typically the acid is selected from the group consisting of hydrochloric, perchloric, nitric, sulfuric, phosphoric, hydrobromic, hydrofluoric, hydriodic, citric, acetic and combinations thereof. Further the composition also desirably contains from about 5 to about 25 weight percent methanol and from about 0.2 to about 1.0 weight percent of a foaming agent. The composition typically has a viscosity from about 20 to about 90 centipoise and preferably from about 60 to about 90 centipoise.

EXPERIMENTAL PROCEDURES

1. Formation samples were extracted of hydrocarbons, leached of salts and dried until the weight stabilized. Basic properties, including grain density, pore volume and permeability to air were measured at 1400 psi net confining stress.

2. Synthetic formation brine was prepared based on the analysis of the formation brine using deionized water and reagent grade chemicals. The brine was filtered to 0.45 microns and degassed. Fluid parameters including viscosity and density were measured at 135° F.

3. Samples were evacuated of air and pressure saturated with synthetic formation brine. Saturation percent was calculated gravimetrically.

4. Each sample was loaded into a centrifuge in an air-displacing-brine configuration. The samples were desaturated at a capillary pressure equivalent to 200 psi. Initial water saturation was calculated gravimetrically.

5. Each sample was briefly saturated with depolarized kerosene.

6. Each sample was loaded into a hydrostatic coreholder and 1400 psi net confining stress was applied. A pore pressure of 200 psi was established by passing depolarized kerosene through the system and around the sample. Coreholder, sample and system were elevated to 135° F. while maintaining net confining stress and pore pressure and allowed to equilibrate for four (4) hours.

7. Crude oil was injected through each sample at a constant rate to displace the depolarized kerosene. Once the depolarized kerosene was displaced and the differential pressure stabilized, effective permeability to oil at initial water saturation was determined.

8. The temperature was reduced to ambient while bypassing crude oil through the system and around the sample. The pore pressure was slowly removed and each sample was unloaded from the coreholder.

9. Each sample was loaded into an aging vessel, covered with crude oil and pressurized to 500 psi. The samples were allowed to age for one week at 135° F. while temperature and pressure were monitored. After wetability restoration, the vessel was cooled to ambient temperature and the pressure was slowly lowered. Each sample was removed for flow testing.

10. Each sample was loaded into a hydrostatic coreholder and 1400 psi net confining stress was applied. A pore pressure of 3800 psi was established by passing depolarized kerosene through a system and around the sample while maintaining 1400 psi net confiding stress. Coreholder, sample and system were elevated to 135° F. while maintaining net confining stress and pore pressure and allowed to equilibrate for four (4) hours.

11. Synthetic formation brine was injected through each sample at a constant rate, while collecting produced volumes of water and oil and monitoring differential pressure and elapsed time until a water-cut of 99.95% or greater was observed. Effective permeability to brine at residual oil saturation was determined at two injection pressures.

Figure 3:
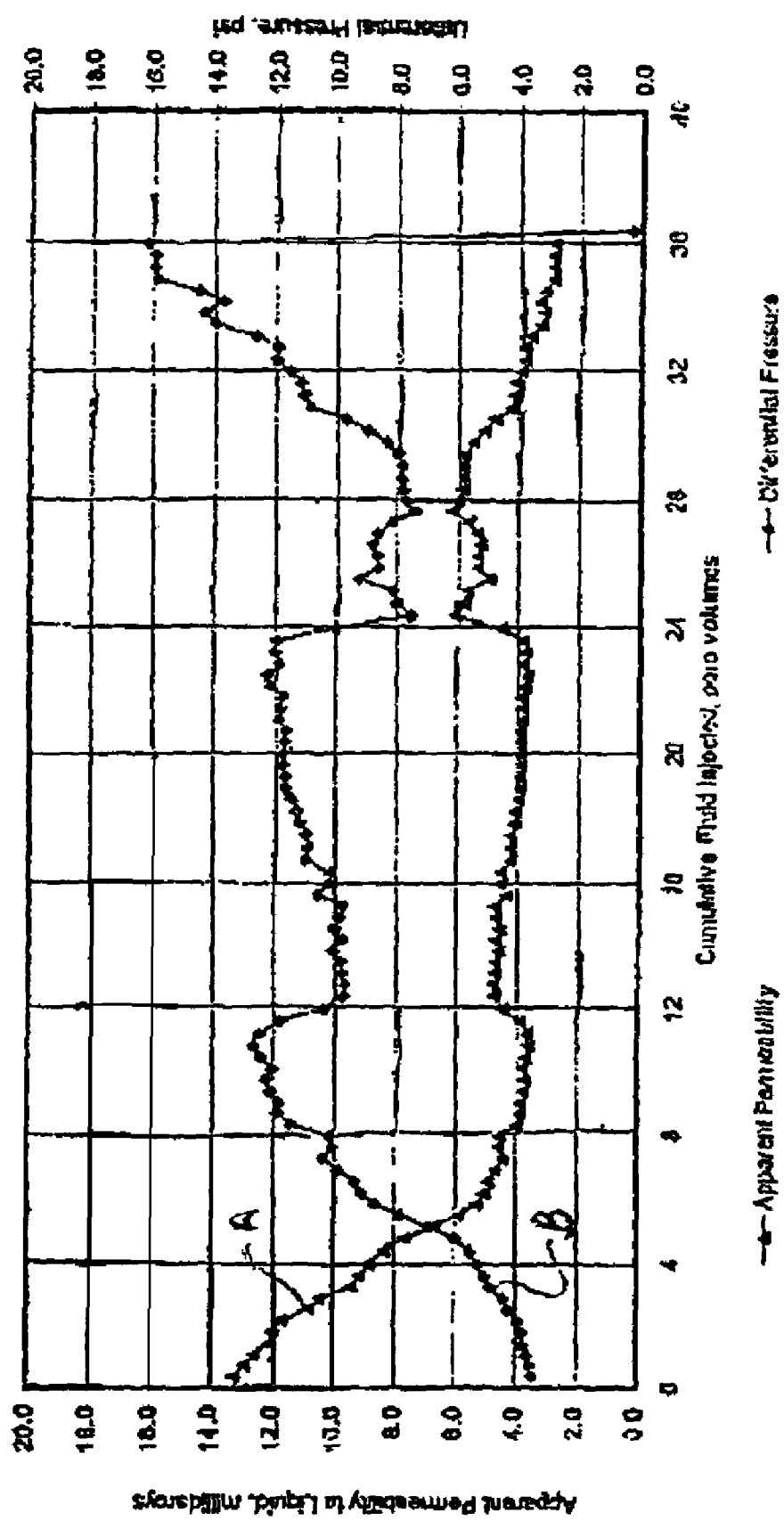
FIG. 3. is a graph showing test results from the tests described herein using the method of the present invention; and, FIG. 4. is a graph showing the results achieved by the use of a conventional process, which was tested in comparison to the process of the present invention.

12. Fifteen percent hydrochloric acid and additives (sample 3C) were injected in the injection direction at a constant rate of 0.25 cc/min. Differential pressure, injected and produced volumes and injection pressure were recorded versus time. When a sudden and sharp decrease in differential pressure was noted, a worm hole had been established (FIG. 3).

13. Fifteen percent hydrochloric acid, additives, foamer and carbon dioxide were co-injected through a second sample (sample 3) in the injection direction at a constant rate of 0.25 cc/min. They were co-injected at an 80:20 carbon dioxide to acid ratio. Differential pressure, injected and produced volumes and injection pressure were recorded versus time. When a sudden and sharp decrease in differential pressure was noted, a worm hole had been established (FIG. 4).

14. The test system and sample were allowed to cool to ambient temperature. Pore pressure and net confining stress were slowly removed. Each sample was unloaded from the hydrostatic coreholder, weighed, extracted of hydrocarbons, leached of salts and dried to a constant weight.

15. Permeability versus throughput data was calculated based upon sample and fluid parameters and data collected using Darcy's Law. Worm hole penetration is calculated from the total amount of fluid injected versus time.

Figure 4:
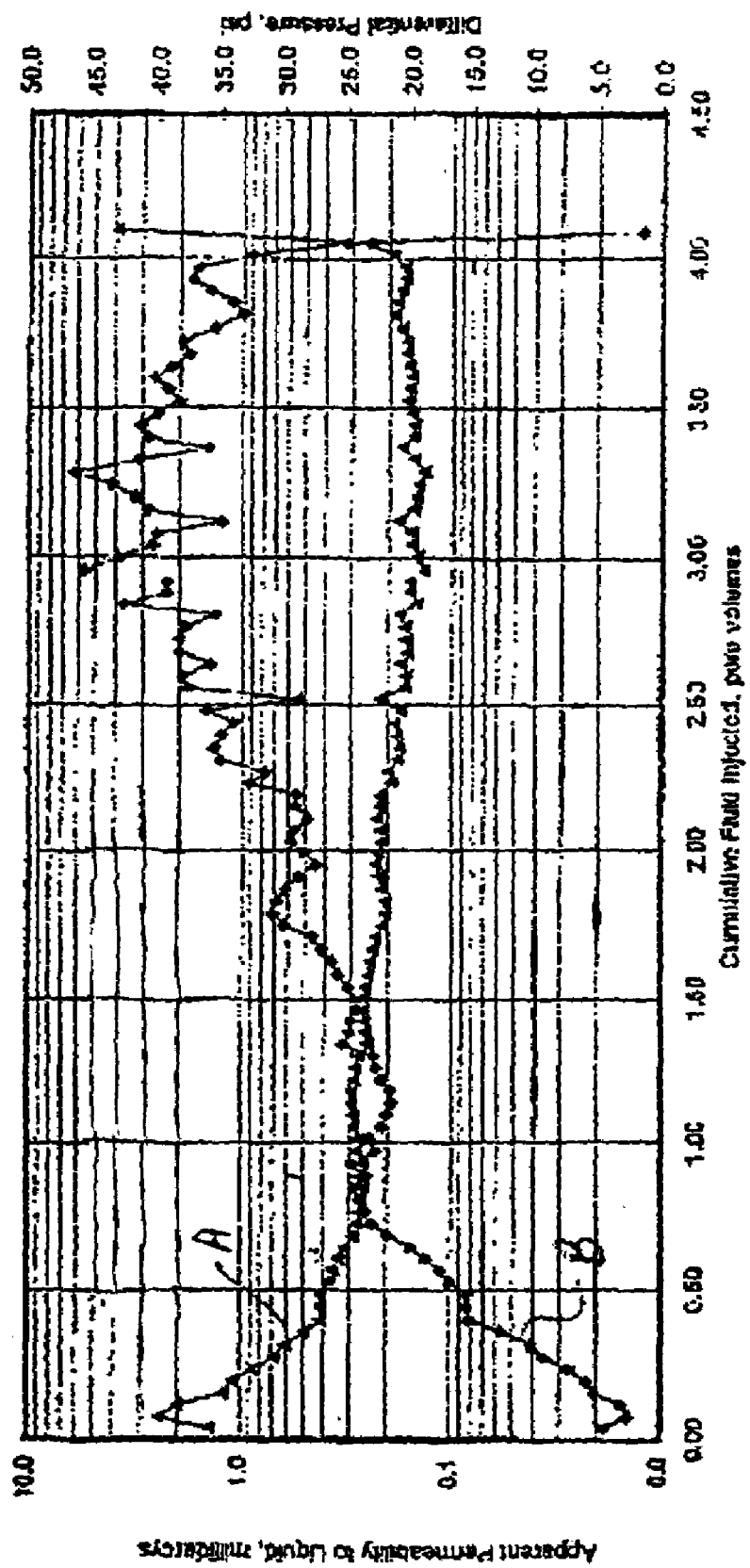

By the method and by the use of the composition of the present invention as shown in FIG. 4, it will be noted that by the use of the composition of the present invention, the formation as treated has exhibited a comparable initial permeability to the tests shown in FIG. 4 with injection being at the differential pressure shown. By the injection of only four pore volumes of treating solution into the formation, the treating composition has passed through the formation leaving a treated zone in the formation from the injection point to a receiving well so that the formation is treated throughout with only four pore volumes of the composition. By direct comparison, when an aqueous acid alone is used, as shown in FIG. 3, it required 36 pore volumes of material to position the injected acid completely through the formation to a receiving well. The invention represents a significant improvement in the expense and the effectiveness of the acid to treat the subterranean formation.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for treating a subterranean formation penetrated from an earth surface by at least one well, the method consisting essentially of:
   a) blending a treating liquid and liquid carbon dioxide to produce an injection liquid containing from about 51 to about 95 weight percent liquid carbon dioxide and from about 5 to about 49 weight percent treating liquid;
   b) injecting the injection liquid into the subterranean formation through the at least one well at a pressure below fracturing pressure in an amount sufficient to treat a desired pore volume of the formation around the at least one well; and,
   c) shutting in the well for at least one hour.

2. The method of claim 1 wherein the carbon dioxide liquid in the injection liquid is present in an amount from about 60 to about 80 weight percent.

3. The method of claim 1 wherein the treating liquid is selected from aqueous organic or inorganic acids, aqueous corrosion inhibitors and aqueous scale inhibitors or organic solvents.

4. The method of claim 3 wherein the treating fluid is an aqueous acid selected from the group consisting of hydrochloric, perchloric, nitric, sulfuric, phosphoric, hydrobromic, hydrofluoric, hydriodic, citric, acetic and combinations thereof.

5. The method of claim 3 wherein the treating liquid is an aqueous organic or inorganic acid and the treating liquid contains from about 5 to about 25 weight percent methanol.

6. The method of claim 3 wherein the treating fluid contains a foaming agent.

7. The method of claim 3 wherein a quantity of a slug containing from about 0 to about 100 weight percent liquid carbon dioxide and from about 0 to about 100 weight percent water or crude oil is injected after the injection of the injection liquid.

8. The method of claim 1 wherein the treating liquid contains a corrosion inhibitor or an organic solvent.

9. The method of claim 1 wherein the treating liquid contains a scale inhibitor.

10. The method of claim 1 wherein the well is shut in for a time from about one hour to about 24 hours after injection of the injection liquid.

11. The method of claim 1 wherein the injection fluid is injected until a worm hole is created into a second well.

* * * * *